J. K. DUGDALE.
Seed-Dropper.
No. 39,386.
Patented Aug. 4, 1863.
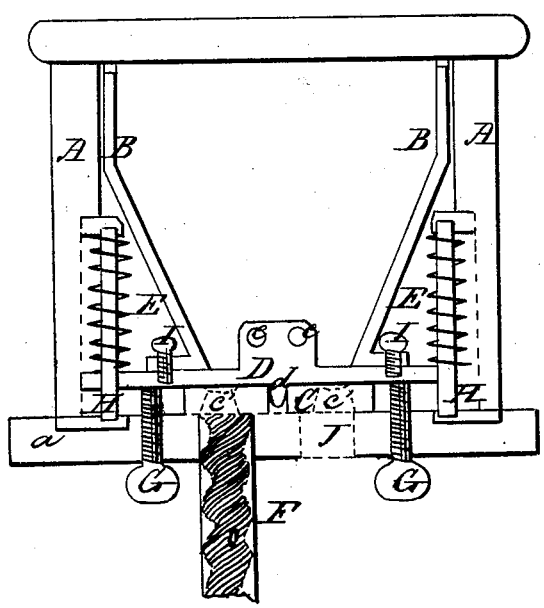

UNITED STATES PATENT OFFICE.

JAMES K. DUGDALE, OF RICHMOND, INDIANA.

IMPROVEMENT IN SEED-PLANTERS.

Specification forming part of Letters Patent No. 39,386, dated August 4, 1863; antedated December 27, 1862.

*To all whom it may concern:*

Be it known that I, JAMES K. DUGDALE, of the city of Richmond, in the county of Wayne and State of Indiana, have invented a new and useful Improvement in Seed-Planters; and I do hereby declare that the following is a full, clear, and exact description of the construction and operation of the same, reference being had to the annexed drawing, showing a transverse section making a part of this specification.

The nature of my improvement consists in the employment of an arrangement of a sliding hopper or seed-box made fast to a cross-plate, which cross-plate serves to cut off the feed, the sliding hopper and cut-off plate being held down by springs working within and being protected and supported by a stationary box or hopper, by which arrangement I am enabled to use plates with seed cells or orifices in for feeding of different thicknesses, and various-sized cells, either a single cell in a plate or any number desired or adjustable cells. The feeding-plates may be made to vibrate or revolve or slide, as may be desired, the arrangement of the hoppers protecting them from getting clogged with seed if cogs or bands are used for giving them motion, and may be worked from the axle of the machine this apparatus may be attached to.

This invention is intended more particularly for horticultural purposes.

Letters A A in the drawing represent the outside box; B B, the inside sliding seed-box; D, the cut-off plate, which serves the purpose of holding the feed-plates in their place by the pin $d$ and also cutting off the feed. Attached to the cut-off plate are two eyes, $e\ e$, in which a handle is hooked for the purpose of lifting the plate D and hopper B B while changing the feeding-plates.

C is a feeding-plate, held in its place by plate D and hopper B B. The hopper B B is made to fit on plate C, so much as is outside of plate D, leaving sufficient space for the cells $c'\ c'$ to be filled with seed.

E E are springs holding the sliding hopper B B and plate D in their places.

H H are rods the plate D slides on. The rods H H are held in their places by sockets at the top and bottom of said rods, secured to box A A.

I I are screws fastening the sliding hopper to plate D.

G G are set-screws to screw up through the bottom of box A A to ease off the pressure of the springs E E, thereby relieving the feed-plate from too great a pressure from plate D and sliding box B B.

J is the opening in the bottom of the outside box, through which the seed pass into the tube.

The lower end of the sliding hopper may be brought to a small point, which will enable the seed to be fed out clean.

By partitioning the hopper different kinds of seed may be fed alternately with vibrating feed-plates. A hollow screw (shown by letter F) may be inserted, as occasion may require, for more effectually scattering small seed along the row between the points the machine may be set for. The box A A is screwed to the bottom board, $a$, and is taken off to insert the hollow screw F, which is inserted from the top of said bottom board, and held up by a flange on said screw and held down by a plate, C.

I do not claim separately or in itself considered any of the parts described; but

What I claim as my invention, and desire to secure by Letters Patent, is—

The arrangement and combination of the above-described apparatus, composed of the sliding hopper B B, cut-off plate D, sliding on rods H H, springs E E, and set-screws G G, as described, and for the purposes set forth.

JAMES K. DUGDALE.

Witnesses:
JOHN FINLEY,
SAML. G. DUGDALE.